(12) United States Patent
Ibrahim

(10) Patent No.: US 11,105,202 B2
(45) Date of Patent: Aug. 31, 2021

(54) METHOD FOR ALIGNING A ROTOR OF A ROTARY EQUIPMENT

(71) Applicant: Saudi Arabian Oil Company, Dhahran (SA)

(72) Inventor: Mohamad Abduladhim Al. Ibrahim, Al-Hasa (SA)

(73) Assignee: Saudi Arabian Oil Company, Dhahran (SA)

( * ) Notice: Subject to any disclaimer, the term of this patent is extended or adjusted under 35 U.S.C. 154(b) by 214 days.

(21) Appl. No.: 16/276,138

(22) Filed: Feb. 14, 2019

(65) Prior Publication Data

US 2020/0263546 A1    Aug. 20, 2020

(51) Int. Cl.
*F01D 5/02* (2006.01)
*G01B 11/27* (2006.01)

(52) U.S. Cl.
CPC ............ *F01D 5/026* (2013.01); *G01B 11/272* (2013.01); *F05D 2230/64* (2013.01)

(58) Field of Classification Search
None
See application file for complete search history.

(56) References Cited

U.S. PATENT DOCUMENTS

| | | | |
|---|---|---|---|
| 3,315,778 A | 4/1967 | Kendall et al. | |
| 3,553,547 A | 1/1971 | Heiberger | |
| 4,502,233 A * | 3/1985 | Boitz | F02B 67/06 33/412 |
| 4,507,926 A | 4/1985 | Teckentrup et al. | |
| 4,919,039 A * | 4/1990 | Nutter | F15B 15/061 74/578 |
| 5,684,578 A * | 11/1997 | Nower | G01B 11/272 33/286 |
| 8,472,033 B2 * | 6/2013 | Takeda | F01K 13/02 356/614 |

(Continued)

FOREIGN PATENT DOCUMENTS

| | | |
|---|---|---|
| EP | 2610443 | 7/2013 |
| KR | 101438107 | 9/2014 |

OTHER PUBLICATIONS

International Search Report and Written Opinion issued in International Application No. PCT/US2020/017837 dated Jun. 12, 2020, 16 pages.

(Continued)

*Primary Examiner* — Shawn Decenzo
(74) *Attorney, Agent, or Firm* — Fish & Richardson P.C.

(57) ABSTRACT

Provided is a method of aligning a gas turbine shaft. The method includes securing a laser sensor to a first shaft of a first rotary component axially connected to a rotor of a gas turbine, and securing a laser generating device to a second shaft of a second rotary component. The second shaft is axially coupled to the first shaft and has a central axis misaligned with respect to a central axis of the first shaft. A jogging assembly coupled to the first rotary component is actuated to rotate the first shaft and the second shaft. Measurements representative of a misalignment of the first shaft and the second shaft are received from the laser sensor, and based on the measurements, a central axis of the first shaft can be aligned with respect to a central axis of the second shaft.

23 Claims, 3 Drawing Sheets

(56) References Cited

U.S. PATENT DOCUMENTS

| | | | |
|---|---|---|---|
| 2007/0253002 A1* | 11/2007 | Hermann | G01B 11/272 356/614 |
| 2011/0149300 A1* | 6/2011 | Takeda | F01K 23/10 356/614 |
| 2011/0161034 A1* | 6/2011 | Barth | G01B 21/24 702/94 |
| 2013/0269194 A1* | 10/2013 | Sansom | G01B 11/27 33/286 |
| 2015/0010386 A1* | 1/2015 | Sue | G01B 11/272 415/118 |
| 2015/0233709 A1* | 8/2015 | Griess | G01B 11/272 356/139.07 |
| 2015/0300802 A1* | 10/2015 | Linde | G01B 11/272 73/494 |
| 2016/0032782 A1* | 2/2016 | Campbell | F01D 25/285 74/128 |
| 2016/0341548 A1* | 11/2016 | Lee | G01B 11/272 |
| 2018/0017381 A1* | 1/2018 | Holzl | G01C 9/02 |
| 2019/0390572 A1* | 12/2019 | Troitino Lopez | F01D 25/285 |
| 2020/0124409 A1* | 4/2020 | Jozokos | F01D 25/285 |

OTHER PUBLICATIONS

"Quick Start Guide MHM-97390, Rev 1 AMS 2140 Machinery Health™, Analyzer Advanced Laser Alignment Application Quick Start Guide Copyright," Dec. 1, 2018, 40 pages.

* cited by examiner

METHOD FOR ALIGNING A ROTOR OF A ROTARY EQUIPMENT

FIELD OF THE DISCLOSURE

This disclosure relates to rotary equipment, for example, gas turbines. More specifically, this disclosure relates to aligning shafts of rotary equipment.

BACKGROUND OF THE DISCLOSURE

An accessory gearbox of a gas turbine has one or more shafts that need to be aligned with respect to one or more auxiliary equipment shafts for the gas turbine to function properly. Methods and systems for improving the alignment processes are sought.

SUMMARY

This disclosure relates to methods of aligning a shaft of an accessory gearbox and other equipment of a gas turbine. More specifically, this disclosure relates to the use of a jogging assembly of the gas turbine to slowly turn the shaft, and a laser device or a dial indicator to align the shaft without disconnecting the shaft.

In one embodiment, a method for aligning a gas turbine shaft is disclosed. The method includes securing a laser sensor to a first shaft of a first rotary component axially connected to a rotor of a gas turbine. The method further includes securing a laser generating device to a second shaft of a second rotary component, the second shaft axially coupled to the first shaft and having a central axis misaligned with respect to a central axis of the first shaft, the laser generating device configured to radiate a laser beam. The method also includes actuating a jogging assembly coupled to the first rotary component to rotate the rotor, the first shaft, and the second shaft in response to a rotation of the first rotary component. The method also includes receiving, from the laser sensor, measurements representative of a misalignment of the first shaft and the second shaft, and based on the measurements, aligning a central axis of the first shaft with respect to a central axis of the second shaft.

In some implementations, actuating the jogging assembly includes rotating the rotor, the first shaft, and the second shaft simultaneously.

In some implementations, receiving the measurements includes receiving the measurements from a processing device including a user interface, where the processing device is communicatively coupled to the laser sensor.

In some implementations, the measurements include at least one of a parallel measurement and an angular measurement. In some implementations, aligning the central axis of the first shaft with respect to the central axis of the second shaft includes moving at least one of the first rotary component and the second rotary component member in one or more directions including a vertical direction, a horizontal direction, and an angular direction.

In some implementations, the jogging assembly includes a hydraulic ratchet system including an electrical switch. In some implementations, actuating the jogging assembly includes manually activating the electrical switch. In some implementations, the hydraulic ratchet system includes a jog circuit. Activating the electrical switch includes closing an electrical contact of the jog circuit to momentarily energizing a hydraulic ratchet gear pump when the electrical switch is activated, where the hydraulic ratchet gear pump is configured to rotate the first rotary component through hydraulic pressure. In some implementations, energizing the hydraulic ratchet gear pump includes energizing an electric motor configured to drive the hydraulic ratchet gear pump.

In some implementations, aligning the central axis of the first shaft with respect to the central axis of the second shaft includes moving, with the first shaft and the second shaft coupled, at least one of the first rotary component and the second rotary component.

In some implementations, securing the laser sensor to the first shaft includes wrapping a chain of the laser sensor around the first shaft, and securing the laser generating device to the second shaft includes wrapping a chain of the laser generating device around the second shaft.

In some implementations, the first rotary component includes an accessory gearbox and the second rotary component includes an auxiliary equipment member.

In another embodiment, a method for aligning a gas turbine shaft is disclosed. The method includes actuating a jogging assembly coupled to a first rotary component to momentarily rotate a first shaft and a second shaft in response to a rotation of the first rotary component. The first shaft includes a first end coupled to the first rotary component and a second end axially coupled to the second shaft, the first shaft including a central axis misaligned with respect to a central axis of the second shaft. The method also includes receiving, from a laser sensor secured to the first shaft, measurements representative of a misalignment of the first shaft and the second shaft, and based on the measurements, aligning a central axis of the first shaft with respect to a central axis of the second shaft.

In some implementations, the rotary component is axially coupled to a turbine rotor, and actuating the jogging assembly includes rotating the turbine rotor, the first shaft, and the second shaft simultaneously.

In some implementations, the method further includes, prior to actuating the jogging assembly, securing the laser sensor to the first shaft, and securing a laser generating device to the second shaft, the second shaft connected to a second rotary component, and the laser generating device configured to radiate a laser beam.

In some implementations, receiving the measurements includes receiving the measurements from a processing device including a user interface, the processing device communicatively coupled to the laser sensor.

In some implementations, the measurements include at least one of a parallel measurement and an angular measurement. In some implementations, aligning the central axis of the first shaft with respect to the central axis of the second shaft includes moving at least one of the first rotary component and a second rotary component in one or more directions including a vertical direction, a horizontal direction, and an angular direction, the second rotary component coupled to the second shaft.

In some implementations, the jogging assembly includes a hydraulic ratchet system including an electrical switch. In some implementations, actuating the jogging assembly includes manually activating the electrical switch. In some implementations, the hydraulic ratchet system includes a jog circuit, and activating the electrical switch includes closing an electrical contact of the jog circuit to momentarily energizing a hydraulic ratchet gear pump when the electrical switch is activated. The hydraulic ratchet gear pump is configured to rotate the first rotary component through hydraulic pressure. In some implementations, energizing the hydraulic ratchet gear pump includes energizing an electric motor configured to drive the hydraulic ratchet gear pump.

DETAILED DESCRIPTION OF THE DISCLOSURE

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described herein and provided in the appended figures are set forth without any loss of generality, and without imposing limitations on the claimed implementations. For example, the implementations are described with reference to a gas turbine. However, the disclosure can be implemented with any rotary equipment that includes a rotating shaft or rotor that needs to be aligned with a rotating shaft or rotor of another rotary equipment.

Figure 1:
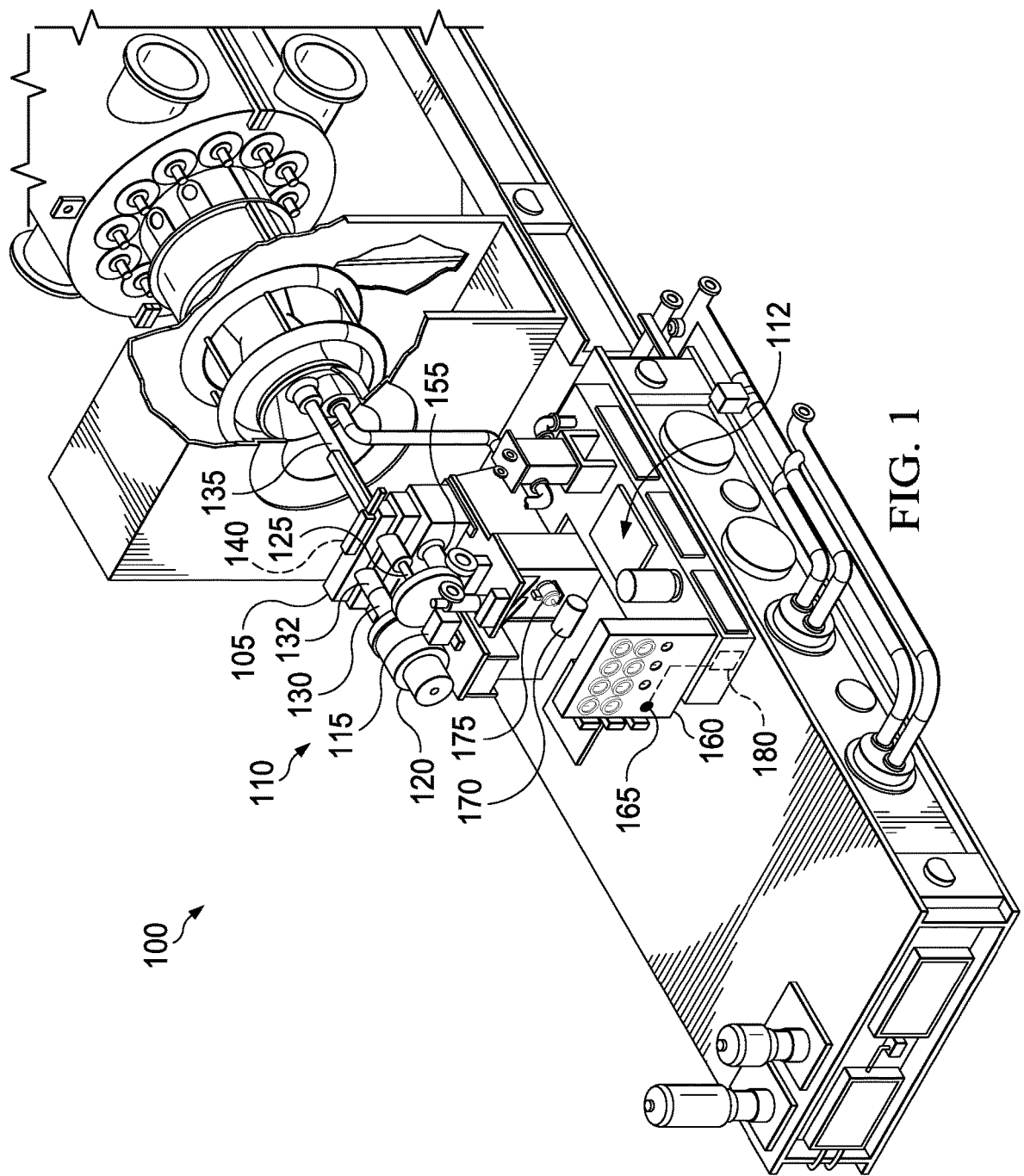
FIG. 1 shows a gas turbine according to an implementation of the present disclosure.

Referring to FIG. 1, a method and system for aligning a shaft or rotor of a gas turbine 100 is disclosed. In some implementations, the method and system includes a jogging assembly 112 configured to momentarily turn a shaft 132 of a first rotary component 105. First rotary component 105 can be an accessory gearbox coupled to a gas turbine rotor 135 on one side, and coupled to a shaft or rotor 130 of a second rotary component 110 on an opposite side. Accessory gearbox 105 can include one or more gears (not shown) coupled to the accessory gearbox shaft or rotor 132 and configured to rotate the shaft 132. The second rotary component 110 can include auxiliary equipment that includes an auxiliary engine or expansion turbine 115, an auxiliary generator 120, and a hydraulic pump 155. The accessory gearbox shaft 132 can be axially coupled to the auxiliary equipment shaft 130 (for example, a shaft of the auxiliary generator 120).

Auxiliary equipment shaft 130 can be misaligned with respect to accessory gearbox shaft 132. For example, a central axis (not shown) of the auxiliary equipment shaft 130 can be in parallel or angular misalignment with respect to a central axis (not shown) of the accessory gearbox shaft 132 or a combination of them. The misalignment between the shafts 130 and 132 can cause gas turbine 100 to vibrate, preventing the gas turbine from working properly. To align shafts 130 and 132, jogging assembly 112 can be used to momentarily turn both shafts 130 and 132 and turbine rotor 135. For example, accessory gearbox 105 can include a hydraulic gear 140 (for example, a hydraulic ratchet gear) with one or more internal gears (not shown) that are configured to be turned by a pressurized fluid (for example, oil) from the jogging assembly 112. The hydraulic ratchet gear 140 can be an assembly of hydraulic cylinders and solenoid valves (not shown), having one or more gears engaged with one or more gears of the accessory gearbox 105. As further discussed in detail below, the jogging assembly 112 can be configured to rotate the gear(s) of the hydraulic ratchet gear 140, which in turn rotates, through the gears of the accessory gearbox 105, the accessory gearbox shaft 132. Accessory gearbox 105 can be configured to simultaneously rotate the rotor 135 and the auxiliary equipment shaft 130. As further described in detail with respect to FIG. 2, as the shafts 130 and 132 rotate simultaneously, shafts 130 and 132 can be aligned using a laser device or dial indicators without disconnecting the shafts 130 and 132. For example, because of the heavy weight of the gas turbine 100, turning the accessory gearbox shaft 132 and the auxiliary generator shaft 130 simultaneously without a jogging assembly can be difficult if not impossible. Without the ability to turn both shafts 130 and 132 simultaneously, a laser device cannot be used because the laser device requires both shafts to momentarily turn for a technician to gather misalignment readings from the laser device. Without the ability to turn both shafts 130 and 132 simultaneously, the shafts have to be decoupled to rotate each shaft individually, and thus align the shafts using a Rim and Face alignment method or a similar method. To align the shafts 130 and 132 using the Rim and Face method, the two shafts 130 and 132 must be disconnected to turn only one shaft at a time, which can be time consuming and can require highly skilled technicians to perform the alignment.

In some implementations, such as the one shown in FIG. 1, the jogging assembly 112 can be a hydraulic system (for example, a hydraulic ratchet system) with an electrical switch 165 (for example, a jog switch or a jog push button) disposed on a gauge panel or electrical panel 160. Gauge panel 160 can include electrical outlets and switches that control components of the gas turbine 100. The hydraulic ratchet system can also include a jog circuit 180 communicatively coupled to the jog switch 165. Jog circuit 180 can be electrically coupled to an electric motor 175 that is configured to drive a hydraulic gear pump 170 (for example, a hydraulic ratchet gear pump). The hydraulic ratchet gear pump 170 is configured to rotate, through hydraulic pressure, the hydraulic ratchet gear 140. The hydraulic ratchet gear 140 engages the gears of the accessory gearbox 105 which can be coupled to the accessory gearbox shaft 132. As the hydraulic ratchet gear 140 rotates, the accessory gearbox shaft 132 rotates to rotate the auxiliary equipment shaft 132. Hydraulic ratchet gear 140 can also be connected to rotor 135 on an opposite side of the accessory gearbox 105 and configured to rotate the rotor 135 as the hydraulic ratchet gear 140 rotates.

In some implementations, such as that shown in FIG. 1, jog switch 165 can be configured to be manually activated to momentarily rotate shafts 130 and 132. For example, when jog switch 165 is triggered (for example, the jog push button is pressed), an electrical contact of the jog circuit 180 can be closed to momentarily energize electric motor 175. When electric motor 175 is energized, a shaft of the electric motor 175 rotates to drive hydraulic ratchet gear pump 170. Hydraulic ratchet gear pump 170 can pump pressurized fluid toward hydraulic ratchet gear 140 to turn the hydraulic ratchet gear 140, which in turn rotates the one or more gears of the accessory gearbox 105. The gears of the accessory gearbox 105 rotate the accessory gearbox shaft 132 and the auxiliary generator shaft 130 that is coupled to the accessory gearbox shaft 132. In some implementations, instead of an electric motor 175 and a hydraulic gear pump 170, a hydraulic motor (not shown) or a similar component can be used to rotate the hydraulic ratchet gear 140. In some implementations, the jog switch 165 can be automatically activated to momentarily rotate shafts 130 and 132. For example, jog switch 165 can be automatically activated using a controller (not shown) that automatically triggers the jog switch 165. The controller can have instructions stored in a memory device and a processor that uses such instructions to control a duration for which the shafts 130 and 132 rotate, and can be configured to automatically stop triggering the jog switch 165. The controller can include an electric latch or triggering mechanism that triggers and releases the jog switch 165. In some implementations, the controller can be synced with the laser device or a processing device associated with the laser device or both, to rotate the shafts to a desired position to gather alignment readings.

Figure 2:
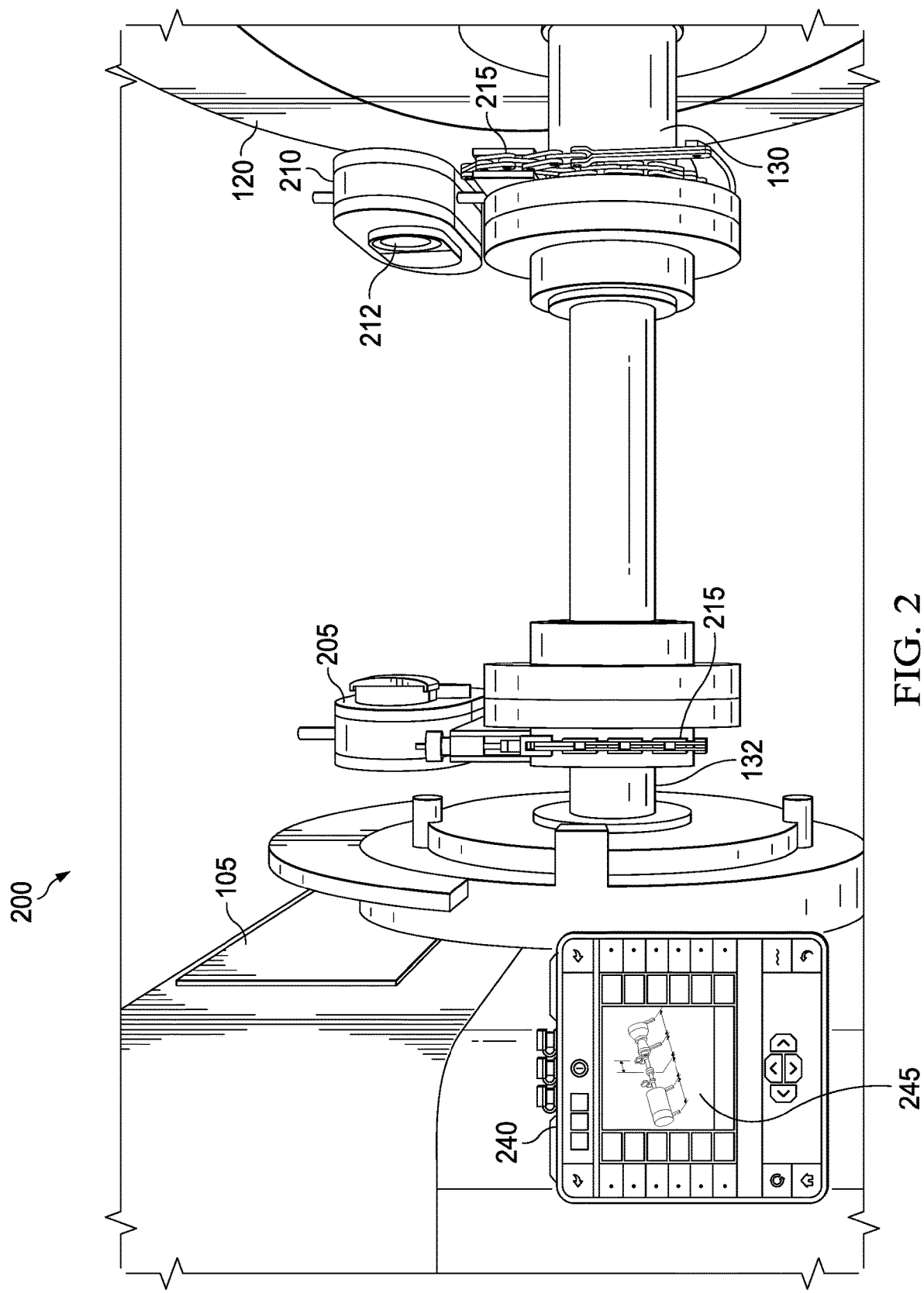
FIG. 2 shows an apparatus according to an implementation of the present disclosure.

Referring to FIG. 2, a laser device 200 can be used to align the gas turbine shafts 130 and 132 using a 'reverse alignment method'. Laser device 200 can be a laser alignment device such as the AMS 2140 Machinery Health Analyzer, available from Emerson Electric Co. Laser device 200 can include a laser generating device 205 (for example, a laser beam emitter) and a laser beam receiver 210. Laser beam receiver 210 can include a sensor 212 such as a laser sensor configured to gather information from the laser beam radiated by the laser beam emitter 205. The reverse alignment method is a method in which the two shafts 130 and 132 are rotated simultaneously with the laser device 200 mounted on the shafts. The reverse alignment method allows the laser receiver 210 to gather data indicative of a misalignment as the accessory gearbox shaft 132 and the auxiliary generator shaft 130 are rotated simultaneously (that is, without decoupling the shafts).

In some implementations, such as that shown in FIG. 2, to align the shafts 130 and 132 using the reverse alignment method, the laser device 200 is first secured to the shafts. The laser beam emitter 205 is secured to the accessory gearbox shaft 132 by clamping the shaft 132 with a mounting bracket (not shown) or wrapping a chain 215 of the laser beam emitter 205 around the shaft 132. Laser beam receiver 210 is similarly secured to auxiliary generator shaft 130 with the sensor 212 facing the laser of the laser beam emitter 205. In some examples, the laser beam emitter can be secured to the auxiliary generator shaft 130 and the laser beam receiver can be secured to the accessory gearbox shaft 132. After the laser beam emitter 205 and the laser beam receiver 210 have been properly secured to their respective shafts and required measurements have been taken, the jog push button (see FIG. 1) can be manually activated to turn the shafts 130 and 132. For example, as the jog push button is pressed, the accessory gearbox shaft 132 and the auxiliary generator shaft 130 rotate simultaneously. Once the jog push button is released, the jogging assembly is de-energized and the shafts 130 and 132 cease rotating. The jog push button can be used to momentarily rotate the shafts 130 and 132 a desired arc distance or to a desired angle such as 30°, 45°, 90°, and so forth. Once the shafts stop turning at a desired position, readings can be taken from the processing device to align the shaft. To 'momentarily turn' the shafts 130 and 132 is referred to herein as a two-step process of turning the shafts, including 1) activating the jog switch, which causes the shafts 130 and 132 to turn uninterruptedly as the jog switch remains activated, and 2) deactivating the jog switch, causing the shafts 130 and 132 to cease turning. In other words, the existing 'slow turning feature' of the gas turbine can be used to turn the shafts 130 and 132 to a desired position to gather alignment measurements. Additionally, in some implementations, to 'momentarily turn' the shafts 130 and 132 is referred to herein as turning the shaft as the jogging mechanism is activated and, after the jogging assembly is deactivated, manually stopping the shaft from rotating. Momentarily turning the shafts 130 and 132 using the jogging assembly allows the shafts to be controllably turned to a desired position, as opposed to starting the turbine, which may not allow a technician to control the amount or speed of turning or both.

In some implementations, such as the one shown in FIG. 2, laser beam emitter 205 radiates a laser beam onto sensor 212 of laser beam receiver 210. As the laser beam receiver 210 and the laser beam emitter 205 rotate with their respective shafts 130 and 132, the position of laser beam of the laser beam emitter 205 shifts with respect to the sensor 212 (when the shafts are misaligned). As the laser beam position shifts, the sensor 212 of the laser beam receiver 210 detects the motion of the laser and gathers the movement information. The information gathered by sensor 212 is sent to processing device 240 by laser beam receiver 210.

In some implementations, such as that shown in FIG. 2, the laser device 200 can be used with a processing device 240 having a user interface 245 that displays the readings or measurements from the laser beam receiver 210. The processing device 240 can include a wireless vibration analyzer or data collector such as the CSI 2140 Machinery Health Analyzer, available from Emerson Electric Co. Processing device 240 can be in data communication with laser beam receiver 210 via a wireless connection. Upon turning the shafts 130 and 132, processing device 240 receives, from laser beam receiver 210, information representative of a misalignment between the auxiliary generator shaft 130 and the accessory gearbox shaft 132. Processing device 240 can display such information in form of misalignment measurements (for example, parallel measurements and angular measurements) or any information useful to align the shafts. The misalignment can include a parallel misalignment between respective central axes of the shafts 130 and 132, or an angular misalignment between respective central axes of the shafts 130 and 132 or a combination of them. Parallel misalignment can be further subcategorized as either horizontal or vertical misalignment. Horizontal misalignment refers to misalignment of the shafts in the horizontal plane (for example, a plane parallel to the central axes of the shafts), while vertical misalignment refers to misalignment of the shafts in the vertical plane (for example, a plane perpendicular to the central axes of the shafts). Angular misalignment occurs when the central axes of each shaft 130 and 132 cross each other at an angel.

To align the shafts 130 and 132, at least one of the accessory gearbox 105 and the auxiliary generator 120 can be moved (for example, by adjusting their mounts), based on the measurements (or movement required represented in another form) displayed on the processing device 240, in a desired direction to align the shafts. For example, the accessory gearbox 105 can be moved (with the shafts 130 and 132 coupled) in an angular direction or in a vertical or horizontal direction to align the central axis of accessory gearbox shaft 132 with respect to the central axis of the auxiliary generator shaft 130. In some implementations, instead of using a laser device 200, a reverse dial method can be used to align the shafts 130 and 132, using dial indicators instead of a laser device. The reverse dial method is similar to the reverse laser alignment method, with the exception of using dial indicators (not shown) instead of a laser beam emitter and receiver to gather misalignment information. For example, instead of securing a laser sensor to a first shaft, a first dial indicator can be secured to the first shaft, and instead of securing a laser beam receiver to a second shaft, a second dial indicator can be secured to the second shaft. The reverse dial method (using dial indicators) can also use the jogging assembly to turn the shafts 130 and 132 simultaneously.

In some implementations, as shown in FIG. 1, other shafts of the gas turbine 100 can be aligned using the methods and systems described herein. For example, an expansion turbine coupling shaft 125 axially coupled to a shaft of the accessory gearbox 105 can also be aligned using the jogging assembly and the laser alignment device. In some implementations, the gas turbine rotor 135 can also be aligned using the methods described herein.

Figure 3:
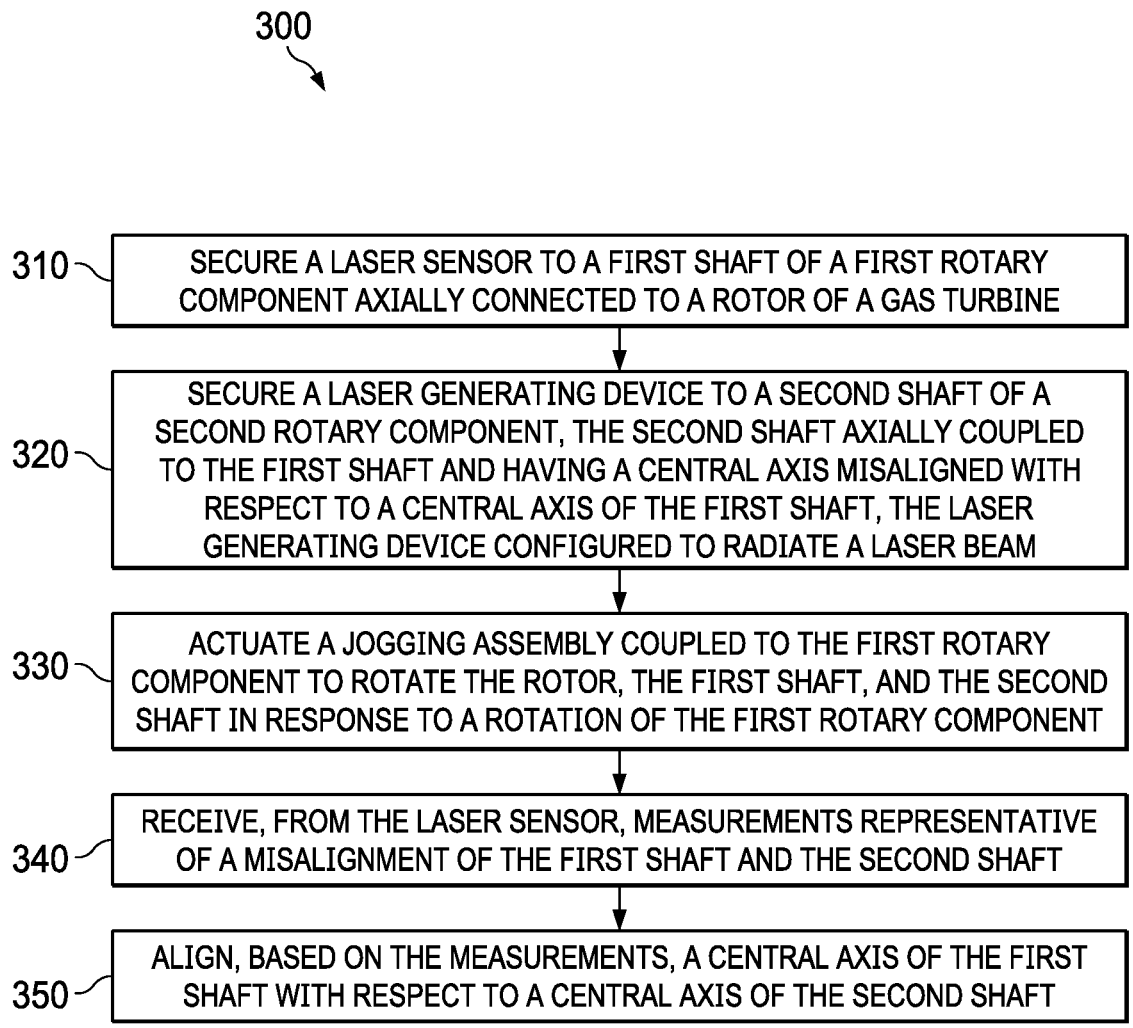
FIG. 3 shows a flow diagram of an example method for aligning a shaft.

Referring to FIG. 3, a process and method 300 for aligning a shaft of a gas turbine includes securing a laser sensor to a first shaft of a first rotary component axially connected to a rotor of a gas turbine (310), and securing a laser generating device to a second shaft of a second rotary component. The second shaft is axially coupled to the first shaft and has a central axis misaligned with respect to a central axis of the first shaft, the laser generating device configured to radiate a laser beam (320). The method also includes actuating a jogging assembly coupled to the first rotary component to rotate the rotor, the first shaft, and the second shaft in response to a rotation of the first rotary component (330). The method further includes receiving, from the laser sensor, measurements representative of a misalignment of the first shaft and the second shaft (340), and then, based on the measurements, aligning a central axis of the first shaft with respect to a central axis of the second shaft (350).

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, or to about another particular value or a combination of them. When such a range is expressed, it is to be understood that another implementation is from the one particular value or to the other particular value, along with all combinations within said range or a combination of them.

Throughout this application, where patents or publications are referenced, the disclosures of these references in their entireties are intended to be incorporated by reference into this application, in order to more fully describe the state of the art to which the disclosure pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

That which is claimed is:

1. A method comprising:
   securing a laser sensor to a first shaft of a first rotary component axially connected to a rotor of a gas turbine comprising an existing jogging assembly;
   securing a laser generating device to a second shaft of a second rotary component, the second shaft axially coupled to the first shaft and having a central axis misaligned with respect to a central axis of the first shaft, the laser generating device configured to radiate a laser beam;
   actuating the existing jogging assembly of the gas turbine coupled to the first rotary component and thereby simultaneously and momentarily rotating the rotor, the first shaft of the first rotary component, and the second shaft of the second rotary component in response to a rotation of the first rotary component;
   receiving, from the laser sensor, measurements representative of a misalignment of the first shaft and the second shaft; and
   based on the measurements, aligning a central axis of the first shaft with respect to a central axis of the second shaft.

2. The method of claim 1, wherein receiving the measurements comprises receiving the measurements from a processing device comprising a user interface, the processing device communicatively coupled to the laser sensor.

3. The method of claim 1, wherein the measurements comprise at least one of a parallel measurement and an angular measurement.

4. The method of claim 3, wherein aligning the central axis of the first shaft with respect to the central axis of the second shaft comprises moving at least one of the first rotary component and the second rotary component in one or more directions including a vertical direction, a horizontal direction, and an angular direction.

5. The method of claim 1, wherein the jogging assembly comprises a hydraulic ratchet system comprising an electrical switch.

6. The method of claim 5, wherein actuating the jogging assembly comprises manually activating the electrical switch.

7. The method of claim 6, wherein the hydraulic ratchet system comprises a jog circuit, and wherein activating the electrical switch comprises closing an electrical contact of the jog circuit to momentarily energizing a hydraulic ratchet gear pump when the electrical switch is activated, the hydraulic ratchet gear pump configured to rotate the first rotary component through hydraulic pressure.

8. The method of claim 7, wherein energizing the hydraulic ratchet gear pump comprises energizing an electric motor configured to drive the hydraulic ratchet gear pump.

9. The method of claim 7, wherein the electrical switch is disposed on an existing electrical panel of the gas turbine.

10. The method of claim 7, wherein neither one of the first shaft of the first rotary component and the second shaft of the second rotary component can be turned by hand.

11. The method of claim 1, wherein aligning the central axis of the first shaft with respect to the central axis of the second shaft comprises moving, with the first shaft and the second shaft coupled, at least one of the first rotary component and the second rotary component.

12. The method of claim 1, wherein securing the laser sensor to the first shaft comprises wrapping a chain of the laser sensor around the first shaft, and securing the laser generating device to the second shaft comprises wrapping a chain of the laser generating device around the second shaft.

13. The method of claim 1, wherein the first rotary component comprises an accessory gearbox and the second rotary component comprises an auxiliary equipment member.

14. A method comprising:
actuating an existing jogging assembly of a gas turbine, the jogging assembly coupled to a first rotary component to momentarily and simultaneously rotate a first shaft and a second shaft in response to a rotation of the first rotary component, the first shaft comprising a first end attached to the first rotary component and a second end axially attached to the second shaft, the first shaft comprising a central axis misaligned with respect to a central axis of the second shaft;
receiving, from a laser sensor secured to the first shaft, measurements representative of a misalignment of the first shaft and the second shaft; and
based on the measurements, aligning a central axis of the first shaft with respect to a central axis of the second shaft.

15. The method of claim 14, wherein the first rotary component is axially coupled to a turbine rotor, and wherein actuating the jogging assembly comprises rotating the turbine rotor, the first shaft, and the second shaft simultaneously.

16. The method of claim 14, further comprising, prior to actuating the jogging assembly:
securing the laser sensor to the first shaft; and
securing a laser generating device to the second shaft, the second shaft connected to a second rotary component, the laser generating device configured to radiate a laser beam.

17. The method of claim 14, wherein receiving the measurements comprises receiving the measurements from a processing device comprising a user interface, the processing device communicatively coupled to the laser sensor.

18. The method of claim 14, wherein the measurements comprise at least one of a parallel measurement and an angular measurement.

19. The method of claim 18, wherein aligning the central axis of the first shaft with respect to the central axis of the second shaft comprises moving at least one of the first rotary component and a second rotary component in one or more directions including a vertical direction, a horizontal direction, and an angular direction, the second rotary component coupled to the second shaft.

20. The method of claim 14, wherein the jogging assembly comprises a hydraulic ratchet system comprising an electrical switch.

21. The method of claim 20, wherein actuating the jogging assembly comprises manually activating the electrical switch.

22. The method of claim 21, wherein the hydraulic ratchet system comprises a jog circuit, and wherein activating the electrical switch comprises closing an electrical contact of the jog circuit to momentarily energizing a hydraulic ratchet gear pump when the electrical switch is activated, the hydraulic ratchet gear pump configured to rotate the first rotary component through hydraulic pressure.

23. The method of claim 22, wherein energizing the hydraulic ratchet gear pump comprises energizing an electric motor configured to drive the hydraulic ratchet gear pump.

\* \* \* \* \*